(12) United States Patent
Schober

(10) Patent No.: US 7,375,816 B2
(45) Date of Patent: May 20, 2008

(54) DITHER MOTOR HAVING INTEGRATED DRIVE AND PICKOFF TRANSDUCERS

(75) Inventor: Christina M. Schober, Saint Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 299 days.

(21) Appl. No.: 11/238,792

(22) Filed: Sep. 29, 2005

(65) Prior Publication Data

US 2007/0081164 A1   Apr. 12, 2007

(51) Int. Cl.
*G01C 19/70* (2006.01)
(52) U.S. Cl. ...................................... 356/476
(58) Field of Classification Search ............... 356/472, 356/473, 474, 475, 476
See application file for complete search history.

(56) References Cited

U.S. PATENT DOCUMENTS

| 4,370,583 | A | 1/1983 | Ljung |
| 4,406,965 | A | 9/1983 | Ljung |
| 4,445,779 | A | 5/1984 | Johnson |
| 4,847,855 | A | 7/1989 | Derry et al. |
| 4,988,908 | A | 1/1991 | Langton |
| 5,020,911 | A | 6/1991 | Gauert et al. |
| 5,173,745 | A | 12/1992 | Hanse |
| 5,326,163 | A | 7/1994 | Langton |
| 6,208,414 | B1 | 3/2001 | Killpatrick et al. |

OTHER PUBLICATIONS

International Search Report for PCT/US2006/037124; Jan. 23, 2006; 12 pages.
Yang, S. M. et al.; Dither-Motor Design with Concurrent Sensing and Actuating Piezoelectric Materials; Smart Materials; Smart Materials and Structures; Jun. 1994; pp. 248-253; vol. 3, No. 2; IOP Publishing Ltd.

*Primary Examiner*—Michael A. Lyons

(57) ABSTRACT

A ring laser gyroscope is described that includes at least one laser gyroscope block and a dither motor, where the gyroscope blocks are configured to engage the dither motor. The dither motor has an outer ring, a hub section, at least one radially extending reed extending between the outer ring and the hub section, and at least one piezoelectric transducer attached the reed. The piezoelectric transducer includes a common piezo-ceramic having a contiguous void line that allows for a separate electrical connection to be made to electrode surfaces on each side of the void line.

19 Claims, 5 Drawing Sheets

DITHER MOTOR HAVING INTEGRATED DRIVE AND PICKOFF TRANSDUCERS

BACKGROUND OF THE INVENTION

This invention relates generally to dither motors, for example, dither motors incorporated within ring laser gyroscopes.

In a ring laser gyroscope, two electromagnetic waves in the form of monochromatic light beams are produced which are propagating in opposite directions. A rotation of the ring laser gyroscope about its input axis increases the path length for one light beam whereas the path length for the other light beam is reduced. The resulting path length change produces a frequency shift within each of the light beams since the oscillating frequency of the laser beams depends on the length of the laser path. Therefore the frequency difference is a function of the rotation rate.

At low rotational rates the frequency difference between both light beams becomes small and both light beams have the tendency to oscillate on the same frequency which is sometimes referred to as lock-in. In order to prevent this mutual interference of both light beams at low rotational rates it is well known to impart a rotary oscillation to the ring laser gyroscope so that the known lock-in effect is eliminated to a large extent.

In order to produce the rotary back and forth oscillation normally a mechanical oscillating device is provided which imparts a dither motion to the ring laser gyroscope. Such a device is commonly referred to as a dither motor and includes a spoked wheel (dither spring). In one known configuration, supports extending from a hub of the dither motor engage a bore formed in each ring laser gyroscope laser block. In another configuration the entire dither motor is placed within the bore of the laser block.

Piezoelectric transducers that are mounted on the spokes of the dither spring produce an oscillating back and forth (dither) movement of the ring laser gyroscope when they are driven by appropriate signals. Such transducers are referred to as drive transducers. Other piezoelectric transducers that output a signal based on the dither movement are referred to as pickoff transducers and are utilized as a feedback device in controlling the oscillation of the dither motor.

Dither motors that are incorporated within ring laser gyroscopes typically include both drive and pickoff piezoelectric transducers. One known dither motors incorporates pickoff piezoelectric transducers that are separate from the drive piezoelectric transducers. These pickoff piezoelectric transducers have a different size and are placed in a separate location than the drive piezoelectric transducers. The separate pickoff and drive piezoelectric transducers add stiffness to the dither spring and cost to the ring laser gyroscope product. In addition, pickoff piezoelectric transducers in a location separate from the drive piezoelectric transducer have a higher variation in phase relative to drive and pickoff voltages generated.

BRIEF DESCRIPTION OF THE INVENTION

In one aspect, a ring laser gyroscope is provided that comprises at least one laser gyroscope block and a dither motor, where the gyroscope blocks are configured to engage the dither motor. The dither motor comprises an outer ring, a hub section, at least one radially extending reed extending between the outer ring and the hub section, and at least one piezoelectric transducer attached to a reed. Each piezoelectric transducer comprises one common piezo-ceramic having a contiguous void line formed therein that allows for a separate electrical connection to be made to electrode surfaces on each side of the void line.

In another aspect, a dither motor for a ring laser gyroscope is provided. The dither motor comprises an outer ring, a hub section, at least one radially extending reed extending between the outer ring and the hub section, and at least one piezoelectric transducer attached to one of the reeds. The piezoelectric transducers comprise a contiguous void line that allows for separate electrical connections to be made to electrode surfaces on each side of the void line.

In still another aspect, a method for fabricating a dither motor for a ring laser gyroscope is provided. The method comprises providing a dither motor frame, the frame including at least one spring reed extending from a hub section to an outer ring, providing at least one piezoelectric transducer having a contiguous void line that allows for separate electrical connections to be made to electrode surfaces on each side of the void line, and attaching the piezoelectric transducers to the reed.

DETAILED DESCRIPTION OF THE INVENTION

Figure 1:
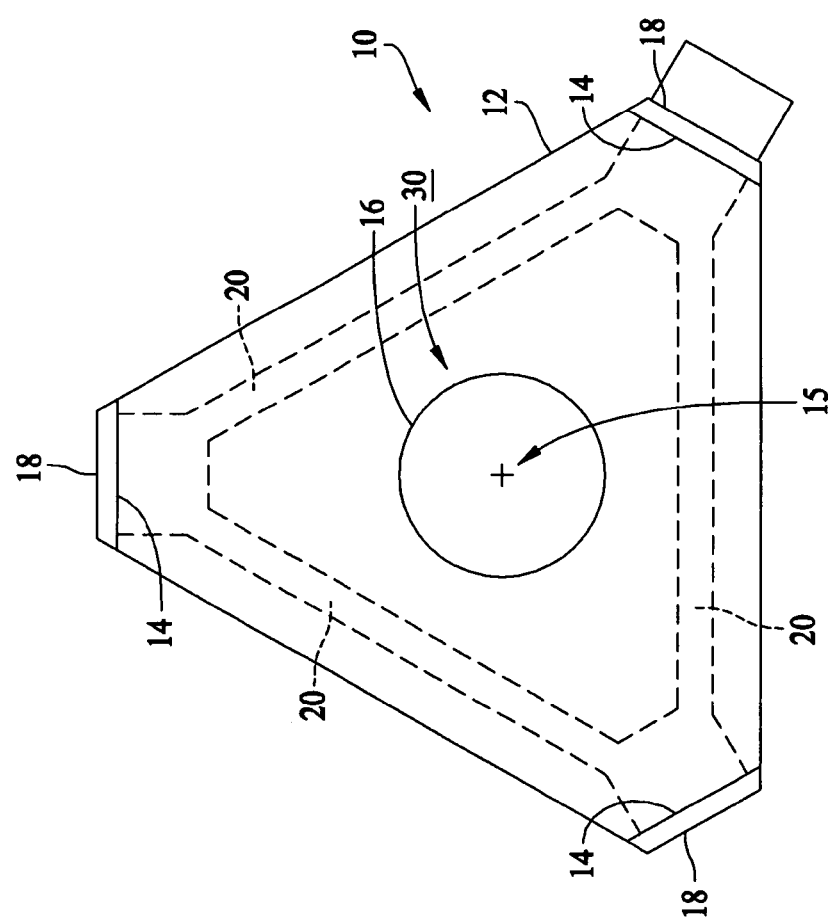
FIG. 1 is a top plane view of a ring laser gyroscope block including a bore therethrough utilized for mounting the gyroscope block to a dither motor.

FIG. 1 is a top plane view of a ring laser gyroscope, generally indicated by the numeral 10, that includes a laser block 12 which provides a closed-loop optical path having three or more apexes 14. A cylindrical mounting bore 16 is located centrally in the block 12, for example, about an axis 15 at the inertial center of gyroscope 10. A plurality of apertures 20 between each apex 14 surround the bore 16 and provide an optical lasing path. Each apex 14 has an appropriate inward facing mirror 18 which in combination provides an optical closed-loop path for counter-propagating laser beams. Although gyroscope 10 is illustrated with a triangular closed-loop path, gyroscope 10 many alternatively be configured with other polygon structures and a corresponding closed loop path.

Bore 16 configures laser block 12 for mounting on a dithering motor or apparatus as further described below. The dither motor provides an oscillation to laser block 12 for prevention of lock-in. The oscillation applied to laser block 12 is generally referred to as dithering of the laser block 12.

Figure 2:
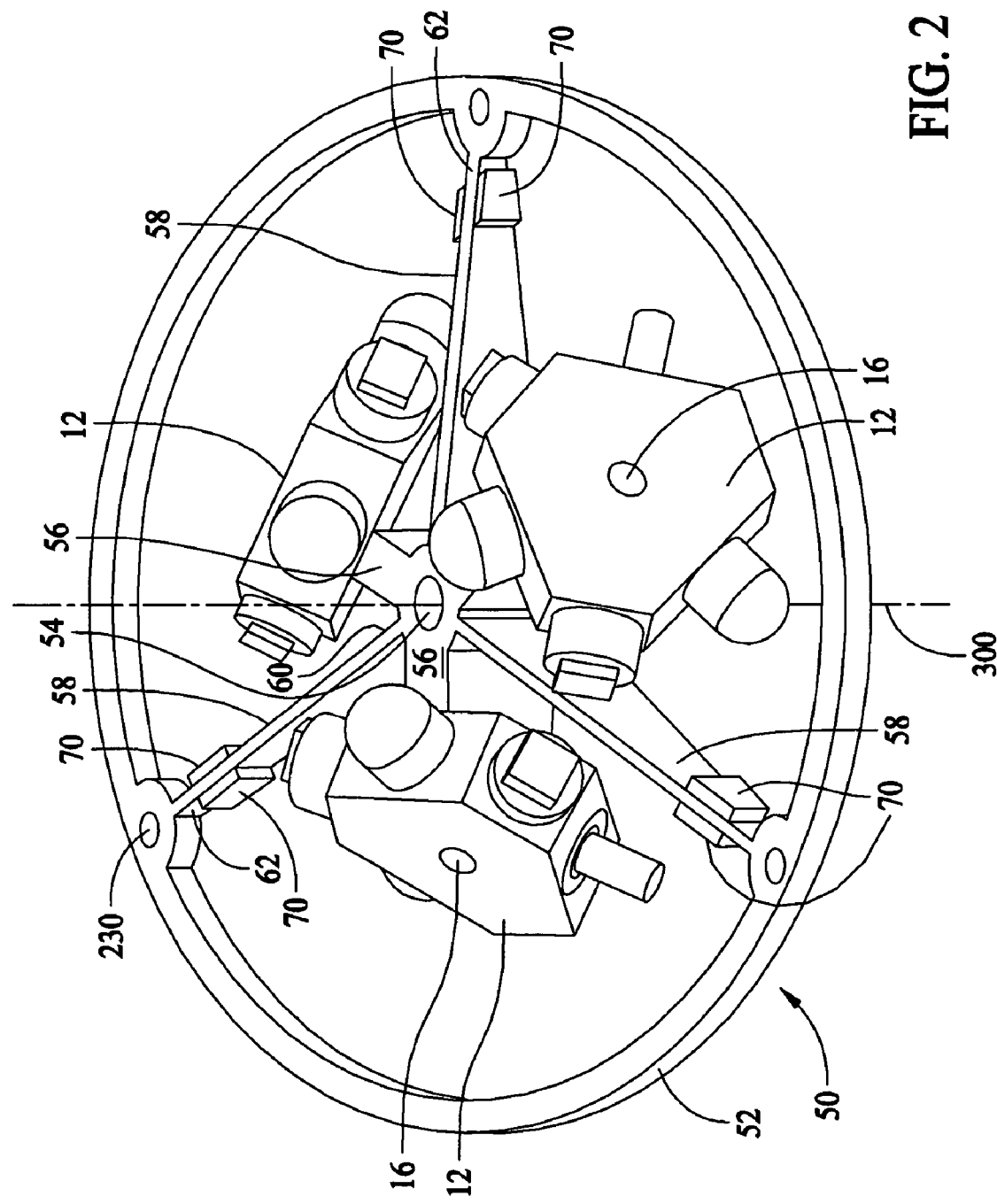
FIG. 2 is an illustration of three gyroscope blocks mounted to a dither motor.

FIG. 2 is an illustration of multiple laser blocks 12 attached at their respective bores 16 to a known dithering apparatus 50, which is sometimes referred to herein as a dithering motor. Dithering apparatus 50 is shown having a generally circular shape, however, it will be understood by those skilled in the art that dither motor 50 need not be a circular shape in order to function. Dither motor 50 includes an outer support ring 52, a hub section 54, a plurality of supports 56 extending from hub section 54, each support 56 configured to engage a laser block 12, and a plurality of radially extending reeds 58. As illustrated, bores 16 of respective laser blocks 12 engage a respective one of supports 56. The plurality of reeds 58 may advantageously be equally spaced from one another. Each of reeds 58 have a hub end 60 and an outer support end 62. Each reed 58 is attached at their hub end 60 to hub section 54 and are equally spaced and project radially outward to the outer support ring 52 where the reeds 58 are attached at their outer support end 62.

Also attached to each reed 58 is one or more piezoelectric transducers 70. These transducers 70 are configured in either of a drive mode or a pickoff mode. In operation, electrical leads (not shown) are attached from ring laser gyroscope electronics and printed circuit boards (neither shown) to the piezoelectric transducers 70 configured in the drive mode to cause the plurality reeds 58 to oscillate or dither. The dithering motion is then passed through the supports 56 onto the ring laser gyroscope blocks 12, thereby preventing the ring laser gyroscope lock-in condition. While dither motor 50 serves to prevent the lock in condition, configuring reeds 58 with pickoff and drive piezoelectric transducers imparts a reduction in the flexibility of reeds 58, as well as increased weight and costs.

Figure 3:
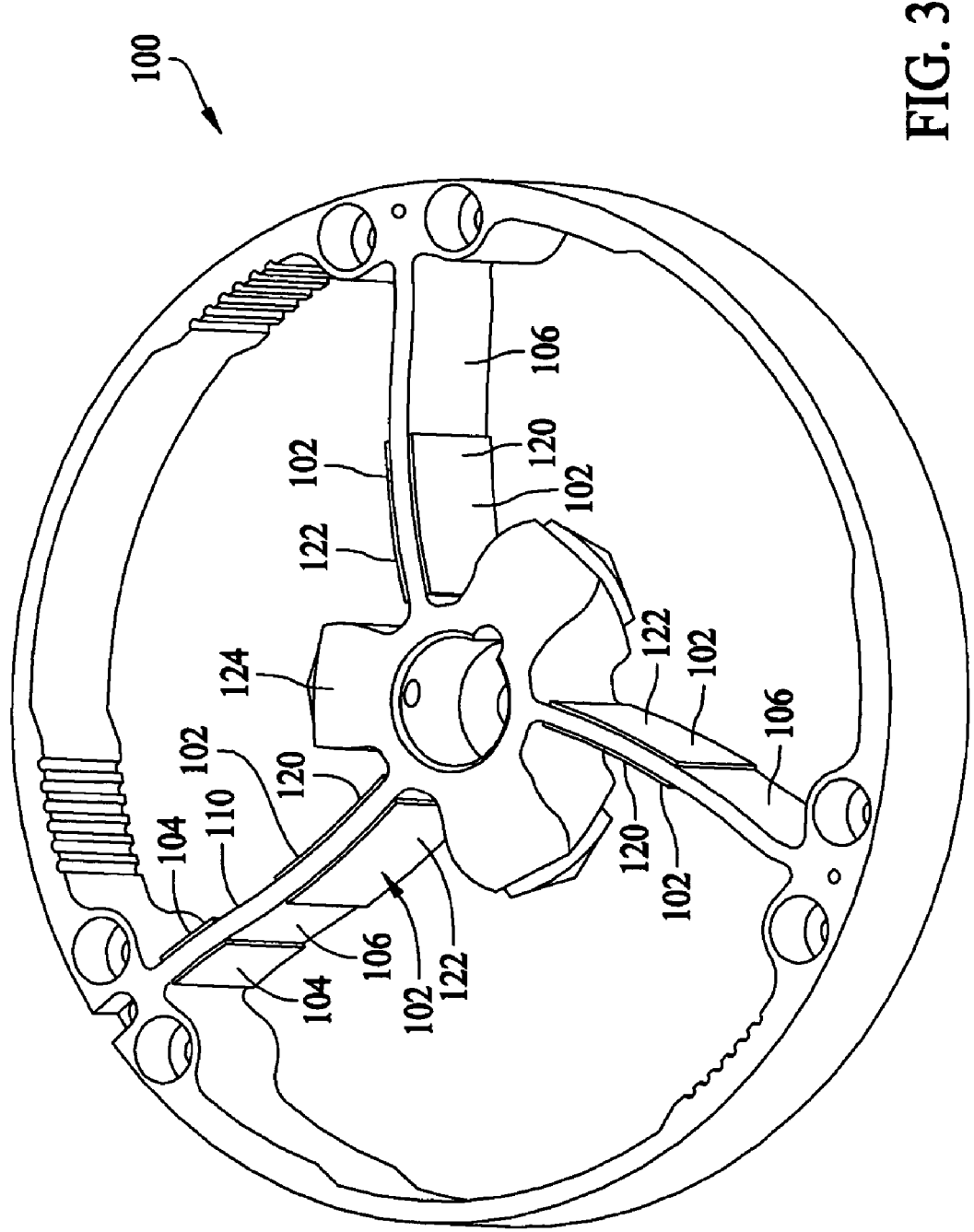
FIG. 3 is an illustration of a dither motor incorporating separate drive and pickoff piezoelectric transducers.

FIG. 3 is a detailed illustration of an alternative embodiment of a dither motor 100 illustrating both drive piezoelectric transducers 102 and pickoff piezoelectric transducers 104 attached to reeds 106. In particular, one reed 110 includes both drive piezoelectric transducers 102 and pickoff piezoelectric transducers 104 attached thereto. It is easily understood how such a configuration reduces the flexibility and weight associated with reed 110 as compared to the other reeds 106.

Drive piezoelectric transducers 102 are poled such that application of a driving signal causes the piezoelectric element to selectively expand or contract. Drive piezoelectric transducers 102 on opposite sides of a reed 106 and 110 each have a pair of opposing electrodes (not shown) connected thereto. Therefore, piezoelectric transducers 102 may have opposite polarities so that application of the same driving signal thereto causes the transducer on one side of reed 106 to expand while the piezoelectric transducer 102 on the other side of reed 106 contracts. Alternatively, if drive piezoelectric transducers 102 on opposite sides of a reed 106 have the same polarity, then the driving voltages must have opposite polarities in order to achieve the desired effect of alternately expanding and contracting.

Therefore, if the piezoelectric transducers 120 contract while the piezoelectric transducers 122 expand, reeds 106 and 110 will deform so that hub 124 of dither motor 100 attempts to rotate. A change in sign of the driving signal causes an opposite direction rotation within dither motor 100.

Figure 4:
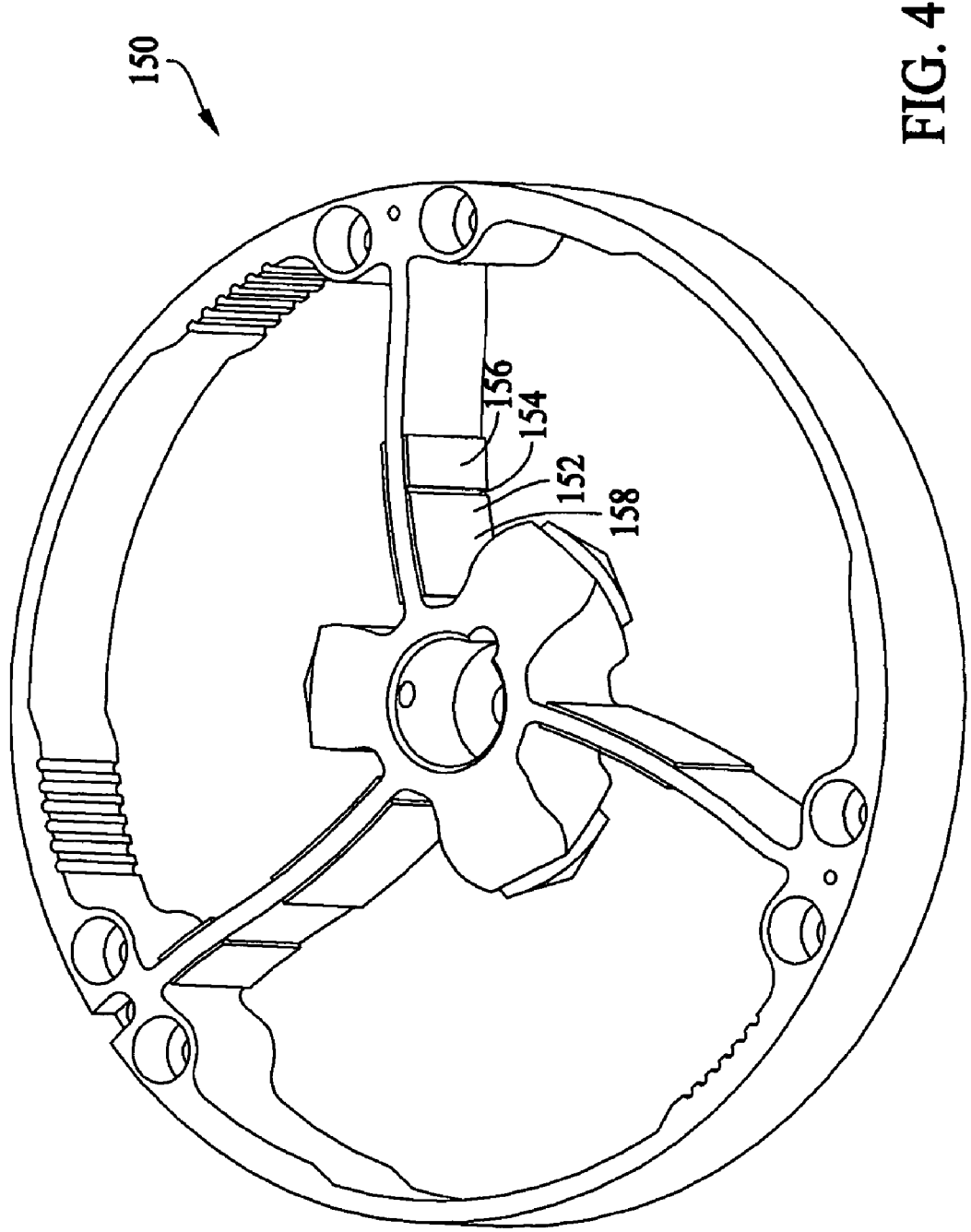
FIG. 4 is an illustration of a dither motor incorporating integrated drive and pickoff piezoelectric transducers.

FIG. 4 is an illustration of a dither motor 150 which incorporates at least one integrated drive and pickoff piezoelectric transducer 152. Dither motor 150 with one or more integrated drive and pickoff piezoelectric transducers (sometimes referred to as ceramics) eliminates the problems associated with separate drive and pickoff piezoelectric transducers. In one embodiment, integrated drive and pickoff piezoelectric transducer 152 utilizes one common base piezo-ceramic.

Figure 5:
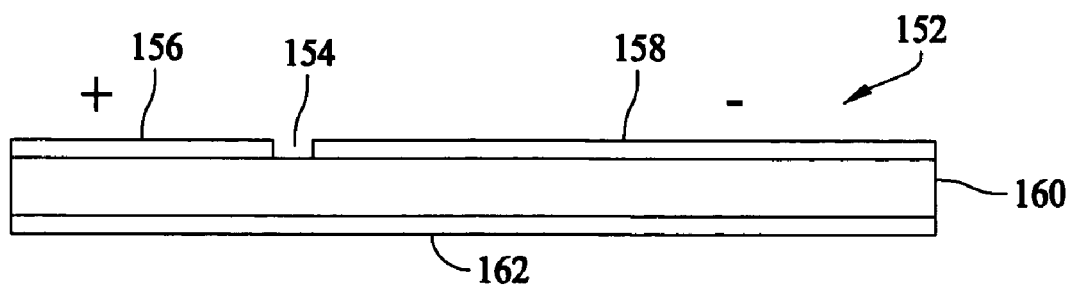
FIG. 5 is a side view of an integrated drive and pickoff piezoelectric transducer.
Figure 6:
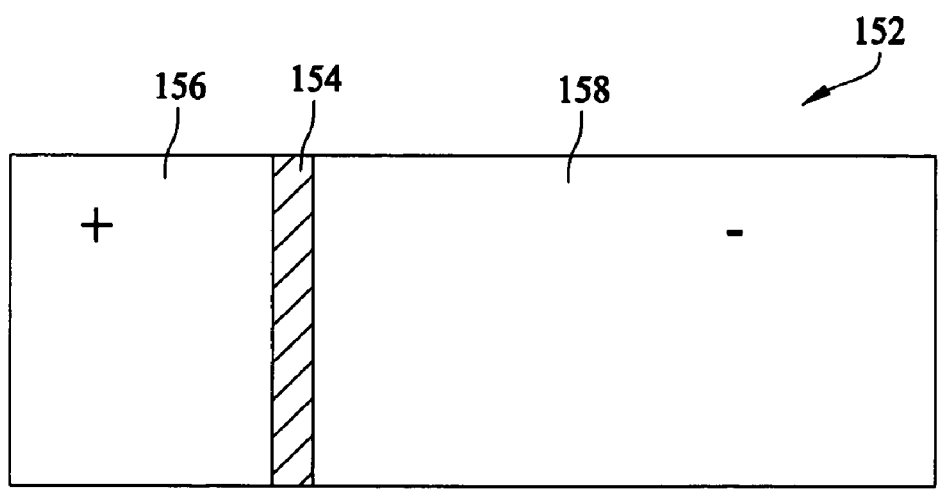
FIG. 6 is a top view of an integrated drive and pickoff piezoelectric transducer.

FIG. 5 is a detailed side view and FIG. 6 is a top view of integrated drive and pickoff piezoelectric transducer 152. Transducer 152 includes one common piezo-ceramic having a contiguous void line 154 that allows for a separate electrical connection to be made to the electrode surfaces 156 and 158 on each side of void line 154. Each of electrode surfaces 156 and 158, in one embodiment, are polarized, for example and as illustrated, surface 156 is marked, for illustrative purposes only, as being positively polarized and surface 158 is marked as being negatively polarized. Electrode surfaces 156 and 158 are on one side of ceramic 160 and a second electrode surface 162 may be formed on an opposite side of ceramic 160. When respective piezoelectric transducers 152 are attached to reeds of a dither motor, a first of transducers 152 is bonded to the reed with the positively polarized electrode surface exposed, and closest to the outer ring, while a transducer 152 that is to be mounted to the other side of such a reed is mounted with the negatively polarized electrode surface exposed, and closest to the outer ring. On one or more of the reeds, the separated areas of transducers 152 can be connected to separately, with one of electrode surfaces 156 and 158 operating as a pickoff transducer, while the other of electrode surfaces 156 and 158 is configured to operate as a drive transducer.

In another embodiment, when electrode surfaces 156 and 158 are bonded to the reeds and second electrode surface 162 is exposed, the transducer is only capable of operating as either a drive transducer or as a pickoff transducer, as electrode surfaces 156 and 158 bonded to the reed effectively creates a short between the two. Further, when electrode surfaces 156 and 158 are exposed (second electrode surface 162 is attached to the reed of the dither motor), they may be electrically connected to one another, and transducer 152 functions as a drive transducer.

Utilization of transducer 152 results in a dither motor configuration for a ring laser gyroscope having spring reeds with a single transducer attached to each side of the reed. In previous dither motor configurations, at least one of the spring reeds had to be configured, on each side, with pickoff piezoelectric transducers. As transducer 152 includes electrically separate areas (e.g., surfaces 156 and 158), the separated areas can be used connected to separately to function as pickoff and drive transducers respectively. In addition, utilization of piezoelectric transducers 152 results in higher pickoff signals because the transducer is located closer to an area of maximum bend of the reed spring. Further, phase relationships between pickoff and drive signals are more consistent than known dither motor with separate pickoff and drive piezoelectric transducers. Location of the separate areas of transducer 152 (placement of void 154) can be adjusted to provide increased pickoff levels, stress reduction, and/or drive authority.

The embodiments disclosed herein refer to a substantially straight void line 154 that separates two substantially rectangular electrode surfaces 156 and 158. However, it is to be understood that the shapes of void line 154 and electrode surfaces 156 and 158 should not be so limited. For example, the void line may have a curved shape or may be a rectangle such that one electrode surface substantially surrounds another, separated by the rectangular void line. Any shape is possible for the void line and the electrode surfaces as long as signals of opposite polarity may be attached to the electrically separate electrode surfaces.

While described herein with respect to a dither motor that is configured to engage multiple ring laser gyroscope blocks, it is contemplated that dither motors configured for insertion into the bore of a single ring laser gyroscope block can also be configured with piezoelectric transducers similar to those described herein. Therefore, while the invention has been described in terms of various specific embodiments, those skilled in the art will recognize that the invention can be practiced with modification within the spirit and scope of the claims.

What is claimed is:

1. A ring laser gyroscope comprising:
    a first gyroscope block;
    a second gyroscope block; and
    a dither motor, comprising:
        an outer ring;
        a hub section;
        a first support coupling said first gyroscope block to said hub section;
        a second support coupling said second gyroscope block to said hub section;
        at least one radially extending reed extending between said outer ring and said hub section; and
        at least one piezoelectric transducer attached to said at least one reed, said at least one piezoelectric transducer comprising one common piezo-ceramic comprising a contiguous void line that allows for a separate electrical connection to be made to electrode surfaces on each side of said void line.

2. A ring laser gyroscope according to claim 1 wherein the electrode surface on one side of said void line is configured as a drive transducer and the electrode surface on the other side of said void line is configured as a pickoff transducer.

3. A ring laser gyroscope according to claim 1 wherein at least one of said piezoelectric transducers is attached to one of said reeds, the surface of said piezoelectric transducer that includes said void line being attached to said reed.

4. A ring laser gyroscope according to claim 1 comprising at least two piezoelectric transducers, each of said transducers attached to opposite sides of one of said reeds.

5. A ring laser gyroscope according to claim 4 wherein the electrode surfaces on each side of said void line are polarized, one said piezoelectric transducer attached to one side of said reed with a positive polarity closest to said outer ring, another said piezoelectric transducer attached to an opposite side of said reed with a negative polarity closest to said outer ring.

6. A ring laser gyroscope according to claim 1 wherein at least one of said piezoelectric transducers is attached to one of said reeds, the electrode surfaces of said piezoelectric transducer on each side of said void line being electrically connected.

7. A ring laser gyroscope according to claim 1 wherein said dither motor comprises at least one laser block support extending from said hub section, said at least one laser gyroscope block configured to engage said laser block support.

8. A dither motor for a ring laser gyroscope, said dither motor comprising:
    an outer ring;
    a hub section;
    at least one radially extending reed extending between said outer ring and said hub section; and
    at least one piezoelectric transducer attached to said at least one reed, said at least one piezoelectric transducer comprising a contiguous void line that allows for separate electrical connections to be made to electrode surfaces on each side of said void line, wherein the electrode surface on one side of said void line is configured as a drive transducer and the electrode surface on the other side of said void line is configured as a pickoff transducer.

9. A dither motor according to claim 8 wherein the surface of said piezoelectric transducer that includes said void line is attached to a surface of said reed.

10. A dither motor according to claim 8 comprising at least one pair of said piezoelectric transducers, each of said pair of said transducers attached to opposite sides of one of said reeds.

11. A dither motor according to claim 10 wherein the electrode surfaces on each side of said void line are polarized, one said piezoelectric transducer attached to one side of said reed with a positive polarity closest to said outer ring, another said piezoelectric transducer attached to an opposite side of said reed with a negative polarity closest to said outer ring.

12. A dither motor according to claim 8 wherein at least one of said piezoelectric transducers is attached to one of said reeds, the surfaces of said piezoelectric transducer on each side of said void line being electrically connected.

13. A dither motor according to claim 8 comprising at least one laser block support extending from said hub section, said at least one laser gyroscope block configured to engage said laser block support.

14. A method for fabricating a dither motor for a ring laser gyroscope, said method comprising:
    providing a dither motor frame, the frame including at least one spring reed extending from a hub section to an outer ring;
    providing at least one piezoelectric transducer having a contiguous void line that allows for separate electrical connections to be made to a first electrode on a first side of the void line and a second electrode on a second side of the void line; and
    attaching the piezoelectric transducer to the reed so that the first electrode operates a first portion of the piezoelectric transducer as a drive transducer and so that the second electrode operates a second portion of the piezoelectric transducer as a pickoff transducer.

15. A method according to claim 14 wherein further comprising
    configuring the first electrode surface on one side of the void line as the drive transducer; and
    configuring the second electrode surface on the other side of the void line as the pickoff transducer.

16. A method according to claim 14 wherein attaching the piezoelectric transducer to the reed comprises attaching the electrode surface of the piezoelectric transducer that includes the void line to a surface of the spring reed.

17. A method according to claim 14 wherein attaching the piezoelectric transducers to the reed comprises attaching a pair of piezoelectric transducers to a spring reed, each transducers attached to an opposite side of the reed.

18. A method according to claim 14 wherein attaching the piezoelectric transducers to the reed comprises:
    configuring the electrode surfaces on each side of the void line with a polarity;
    attaching one of the piezoelectric transducers to one side of the reed with a positive polarity closest to the outer ring; and
    attaching another of the piezoelectric transducers to an opposite side of said reed with a negative polarity closest to said outer ring.

19. A method according to claim 14 further comprising electrically connecting the surfaces of the piezoelectric transducer on each side of the void line.

* * * * *